United States Patent

Lagoutte

[15] 3,635,636
[45] Jan. 18, 1972

[54] APPARATUS FOR FORMING HOLLOW BODIES

[72] Inventor: Serge Lagoutte, Chalon-sur-Saone, France

[73] Assignee: Societe d'Etudes Verrieres Appliquees, Neuilly-sur-Seine, (Seine), France

[22] Filed: Nov. 8, 1968

[21] Appl. No.: 774,385

[30] Foreign Application Priority Data

Nov. 9, 1967  France..................127539

[52] U.S. Cl. ..........................425/326, 425/342, 425/233
[51] Int. Cl. ......................................................B29c 17/07
[58] Field of Search..............18/5 BO, 5 BP, 5 A, 5 BE, 20 B; 25/103

[56] References Cited

UNITED STATES PATENTS

| | | | |
|---|---|---|---|
| 2,750,625 | 6/1956 | Colombo | 18/5 BP |
| 3,035,302 | 5/1962 | Lysobey | 18/5 BP X |
| 3,111,711 | 11/1963 | Colombo | 18/5 BP |
| 3,473,192 | 10/1969 | Martelli | 18/5 BP |

*Primary Examiner*—J. Spencer Overholser
*Assistant Examiner*—Ben D. Tobor
*Attorney*—Pennie, Edmonds, Morton, Taylor and Adams

[57] ABSTRACT

Hollow bodies such as bottles are blow molded from tubular plastic material produced along an axis defined in an extruder therefor. A plurality of molds supported on a mold carrier are driven by that carrier successively through a closed path which intersects that axis. As each mold is carried to the position where it intersects the axis of the extruder, the mold closes on a section of the plastic material to permit blowing thereof to the shape defined by the mold. At this time moreover that mold engages against an abutment fixed with respect to the extruder and imposes a relative motion on the extruder and mold carrier which holds that mold coaxial with the extruder axis until the next mold comes into coaxiality with that axis.

3 Claims, 4 Drawing Figures

3,635,636

PATENTED JAN 18 1972

INVENTOR.
Serge Lagoutte
BY Pennie, Edmonds,
Morton, Taylor and Adams

ATTORNEYS

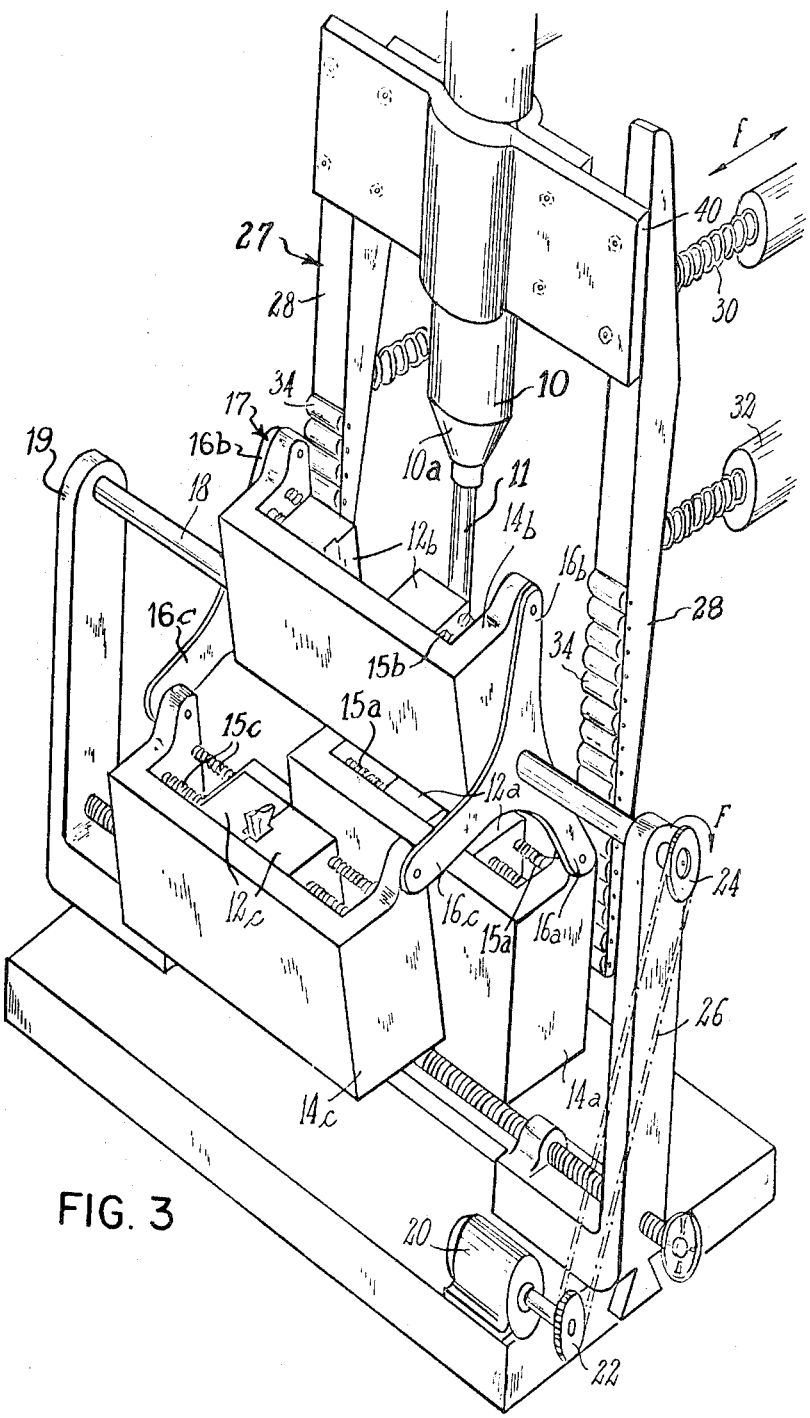

APPARATUS FOR FORMING HOLLOW BODIES

The present invention pertains to the continuous formation of hollow bodies by blowing from hollow tubular blanks or gobs of material brought to a plastic state.

The invention more particularly concerns the continuous formation of hollow bodies of thermoplastic material by the blowing of tubular blanks in a mold, the blanks being formed, e.g., by extrusion.

More particularly still the invention pertains to a known process according to which the mold seizes and then carries the blank either exactly or substantially along the direction of formation of the blank, which in the case of extruded blanks may be the direction along which the blank is extruded.

In known processes of this type the tubular blank is maintained under tension between its point of origin (at the outlet from the extruder, e.g., and the mold which has closed over it. The mold thus performs a stretching function on the material until the next following mold has closed over a new length of the tubular material now extending from the extruder. This makes it possible to position accurately the blank, which is stretched between two points.

Moreover, the coaxial relation between the point of origin of the gob or blank (e.g., at the outlet from the extruder), the arriving mold in the process of closing, and the preceding mold, makes it possible when desired to stretch the gob by imposing on it one speed at its point of formation, e.g., at its exit from the extruder, and a different speed upon the mold which has closed on it. This stretching makes it possible to effect a better control on the thickness of the walls of the molded bodies, particularly in the portions or sections which join parts of different diameters. In a bottle, the part between the neck and the body is an example.

In the practice of this known method two successive molds must be located as close to each other as possible at the time when the second mold closes, in order that the portion of the blank which joins the two molds and which constitutes a waste or loss may be reduced to a minimum.

One way of carrying out this process is to provide a machine having a circular motion. It should however be a machine of relatively simple construction when a large number of molds is involved.

Thus in a machine employing a horizontal rotating table the molds may be disposed on a circle of large circumference, two successive molds being nearly in contact with each other and having their axes tangent to this circle at points slightly spaced on that circle so that the two molds are almost parallel and collinear.

Similarly, in an endless chain type of machine, two successive molds may be coaxially disposed nearly in contact with each other on a straight portion of the chain.

If however the machine is of circular type this will no longer be true when the number of molds is reduced. In that event, on a drum or plate-type machine, the molds will be disposed on a circle of relatively small diameter. Hence the axes of two adjacent molds will be inclined to each other at a substantial angle and the separation of the two molds will be relatively large, resulting in substantial wastage of material. Similarly in an endless chain type of machine, if the number of molds is small the length of the chain will be insufficient to close the circuit under favorable conditions.

It is an object of the present invention to provide a machine of rotating or circular motion type, accommodating a small number of molds but spacing adjacent molds close together and providing coaxiality between them on the one hand and the gob-forming device (e.g., extruder) on the other.

It is sufficient if these conditions are fulfilled for a short time. This short time is specified in two ways. Firstly, as to the coaxiality between the extruder or equivalent device and the mold instantaneously pulling or stretching the material emerging from that device, the critical time is that which extends from the instant when the still open mold closes on the emerging gob of plastic material and the instant when the next following mold closes on a new section of that material.

Secondly, as to the coaxiality and proximity of two successive molds, this condition should be fulfilled at the instant of time when the second or rearmost of these molds closes on the blank. This will hereinafter be referred to as the critical instant for that mold. The critical instant for each mold thus occurs at the start of the critical period therefor.

In accordance with the present invention, these objects are achieved by giving to the molds a pivoted or articulated mounting on the means which carry and drive them. By virtue of this articulation the invention is able to impose on the molds, by proper and suitable means of guidance and at the necessary times, the desired conditions of proximity and coaxiality between the molds and the material to be blown.

It is a further object of the invention to provide means for carrying out the process thereof.

In one embodiment of the invention the extruder or equivalent and the mold carrier are disposed in fixed relative position and the desired coaxiality is provided by variation in the length of the radius arms at the end of which the molds rotate about the axis of rotation of the mold carrier.

This may be achieved, e.g., by mounting the molds on arms along which they are capable of moving. Alternatively, they may be mounted on telescopic arms or on jointed arms. Such embodiments have among others the advantage that two successive molds will remain in coaxial relative position during a time which extends beyond the critical instant, which fact facilitates seizure of the blank by the mold closing on it.

In another embodiment the length of the arms at the ends of which the molds rotate about the axis of the mold carrier is fixed, and means are provided to produce a relative displacement between the frame which carries the extruder and that which supports the mold carrier, in such fashion as to assure coaxiality between the molds and the blank during the critical period and at the critical instant.

In this second form of construction, the extruder may be fixed in position while the mold carrier is translatable. In the presently preferred nonlimitative exemplary embodiment of the invention to be hereinafter described in detail, however, it is the frame which supports the mold carrier which is fixed whereas the extruder is movable.

It is to be observed that the guide means which serve to orient the molds during the critical period and at the critical instant so as to bring them into parallelism with the extrusion axis may at the same serve to effect displacement of the extruder by reference to the mold carrier so as to transform this parallelism into actual coaxiality.

Although the molds are in accordance with the invention brought into coaxiality with the extrusion axis during the critical time period and instant, the coaxiality and indeed the parallelism thereof with the extrusion axis are not necessary to be maintained throughout the remainder of the path of motion of the molds. On the contrary, the invention contemplates that in certain cases supplementary means may be provided to impose upon the molds at various points in their path particular orientations which may be desirable, e.g., at the time of ejection of the blown object from the mold or at phases of the cyclical motion of the molds in which pairs of successive molds might be so close together as to strike each other.

In other words, the articulated support of the molds on their carrier, which is a feature of the invention, makes it possible not only to impose rigorous coaxiality of the molds with the extrusion axis at particular portions of the path of travel of the molds, but also to give to the molds at other portions of their paths any other desired orientation desirable or useful for simplification of the machine and dependability in its operation.

The detailed description now to be given pertains to an embodiment of the invention in which there is employed vertical extrusion and wherein the mold carrier undergoes rotation but not translation whereas the extruder undergoes translatory motion.

BRIEF DESCRIPTION OF DRAWINGS

The invention will now be further described in terms of a presently preferred nonlimitative exemplary embodiment thereof and with reference to the accompanying drawings, in which:

FIG. 3 is a perspective view of the apparatus schematically shown in FIG. 1.

DESCRIPTION OF PREFERRED EMBODIMENT

Figure 1:
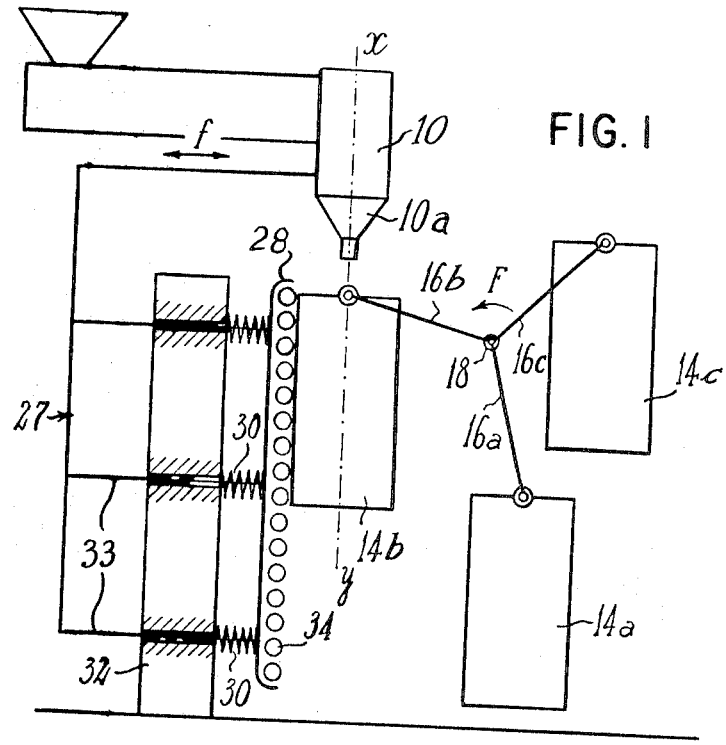
FIG. 1 is a diagrammatic elevational view of a machine according to the invention.
Figure 2:
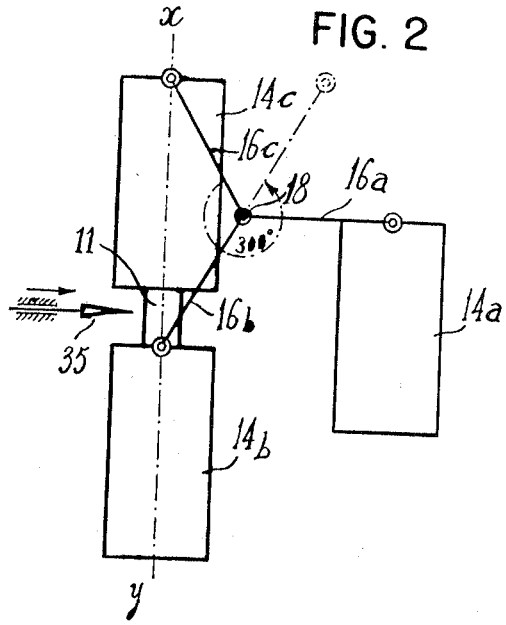
FIG. 2 is a fragmentary diagrammatic view of the machine of FIG. 1 illustrating the relative position of two molds when they are coaxial with the axis of extrusion, which axis is denoted $xy$ in the figure.

Referring now to FIGS. 1 to 3, it will be seen that the machine of the invention includes in the embodiment illustrated an extruder 10, which may be of known type, having a nozzle 10a with a vertical axis. Reference character 11 denotes a tubular extrusion of plastic material delivered by the extruder. Beneath the extruder there are presented successively a plurality of molds, three in number in the example illustrated, the molds being identified at reference characters 12a, 12b and 12c in FIG. 3. The molds are disposed in cradles 14a, 14b and 14c which form part of a mold carrier generally indicated at 17. Each mold comprises two half molds which can be shifted parallel to each other and symmetrically to their parting plane as indicated in FIG. 3.

Each mold cradle is hingedly supported on a pair of arms as indicated at 16a, 16b and 16c in FIGS. 1, 2 and 3, fixed at uniform angular intervals to be a shaft 18.

The shaft 18 is subjected to uniform rotation between adjustable supports 19, for example, by mans of the motor 20 and sprocket wheel and chain drive 22, 24 and 26 of FIG. 3. The result is that the arms 16a, 16b and 16c execute uniform rotational motion in the same direction as indicated at the arrows F in FIGS. 1 and 3. The diagrammatic showings of FIGS. 1 and 2 may be considered as simplifications of an elevational view along the shaft 18 looking from left to right in FIG. 3. Hence the indication of counterclockwise rotation for shaft 18 in FIGS. 1 and 2 and of clockwise rotation thereof in FIG. 3.

The mold cradles 14a, 14b and 14c thus undergo rotation in circular paths with a constant spacing from each other determined by the number of molds. In the example illustrated, this spacing is 120 angular degrees.

The length of the arms 16a, 16b and 16c is selected as a function of the dimensions of the molds so that two successive molds will be nearly in contact with each other when the arms supporting the third mold are horizontal. This is the condition of affairs illustrated in FIG. 2, where it will be seen that the two mold cradles 14b and 14c, and hence the molds therein, are spaced by a small vertical distance only.

This position in which the two molds have their vertical axes collinear with each other in the axis $xy$ of the extruder nozzle (cf. FIGS. 1 and 2) will be described as the "critical point" for the upper mold, namely in FIG. 2 the mold 12c, which, as indicated in FIG. 3, is contained in the cradle 14c.

The extruder 10 is mounted on a movable support generally indicated at 27. The support 27 includes rails 33 movable in guide apertures of a fixed guide 32 in such fashion that the extruder can be subjected to parallel horizontal motion as indicated by the arrows $f$ in FIGS. 1 and 3. The exact coaxial positioning of the molds by reference to the extruder at the time when the molds are to close on the blank and preservation of this position during the critical period hereinabove defined are obtained by the provision of guide means for the molds such as the sets of rollers 34 mounted in the extruder support 27.

In the embodiment illustrated, the rails 33 carry a pair of members 28 (FIG. 3) extending parallel to the axis $xy$ of the extruder, and the members 28 are equipped with rollers 34. Springs 30 are engaged about the rails 33 between the members 28 and the fixed frame 32 so as resiliently to stress the support 27 toward the shaft 18. As shaft 18 rotates, the molds will be brought in succession into alignment with the extruder axis $xy$. Each mold will moreover, by horizontal translational motion imposed by it on the support 27, maintain alignment between itself and the axis $xy$ of the extruder from the phase at which its cradle comes into contact with the rollers 34 until a phase 120° later in the rotation of shaft 18 when the next mold cradle comes into contact with the rollers 34. At this phase 120° later the first mold parts contact with the rollers 34, moving to the right in FIG. 2 for mold 14b. The plane tangent to the side of rollers 34 adjacent the shaft 18 is thus parallel to the extruder axis $xy$ and distant therefrom by a distance equal to the distance between the face of the mold cradle presented to those rollers and the axis of the mold itself, which distance is preferably the same for all three molds.

Thus FIG. 1 illustrates the condition of affairs after mold cradle 14b has effected partial compression of the springs 30, driving the frame 27 and extruder 10 part-way to the left in that figure and thereby maintaining coaxiality between the axis of the mold in the cradle 14b and the extruder axis $xy$.

In FIG. 3 mold 12a is returning to the left, as seen in that figure, and the rollers 34 and extruder 10 are following that leftward horizontal component of its movement, while the open mold 12b is moving to the right, as seen in that figure, and will shortly bring up against the rollers 34 with its axis in alignment with the axis of the extruder and with that of mold 12a. Mold 12b will thereupon close.

As each mold comes into the position illustrated for mold 12c by its cradle 14c in FIG. 2, i.e., into the position wherein its axis comes into coincidence with the extrusion axis, that mold closes about the section of tubular plastic material which has been extruded during the descent of the previous mold (12b in cradle 14b, in FIG. 2) along the extrusion axis $xy$. Blowing may then begin in the mold which has just closed. Upon closing of the mold it pinches the tubular extrusion closed at one or both ends to permit blowing. Thus it may pinch the extrusion together at the lower end of the mold, blowing being effected through the mandrel of the extruder. Or the mold may pinch the tubular extrusion at the upper end with blowing being effected from below. Alternatively, the mold may pinch the extrusion at both ends, blowing then being effected through a needle inserted by suitable mechanism from the side.

The plastic tube can be cut off above the mold in which blowing is completed (that in cradle 14b in FIG. 2) and below the mold newly closing about the tube (the mold in cradle 14c in FIG. 2) when those two molds bring their axes into alignment with each other and with the extruder axis $xy$, as illustrated in FIG. 2, where a severing knife is indicated at 35.

The blowing and chilling means, which may be conventional and which do not form part of the invention per se, have not been illustrated. They may advantageously employ the technique known under the phrase "rotating joints."

According to one known mode of operation, each mold opens when it arrives at a position approximately 300° after closing, as indicated in FIG. 2. The molded object is detached and ejected. The molded object is then transferred to a finishing station. The two halves of that mold then are held in their separated position until they again are caused to close about the tubular plastic material emerging from the extruder 10, thereupon the cycle begins again for that mold.

Figure 4:
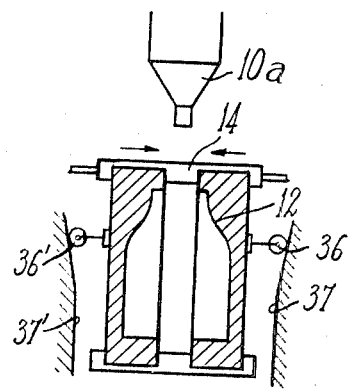
FIG. 4 is a sectional view through one of the molds.

FIG. 4 illustrates diagrammatically known means which can be employed to open and close the molds. These means comprise vertically movable rollers 36 and 36' disposed on the separate halves of the mold which cooperate with ramps or cam surfaces 37 and 37' fixed with respect to supports 19 or 27. The rollers are actuated by said cam surfaces to hold the molds closed during the complete cycle of their rotation about the axis of shaft 18 except over a sector of from 60° to 100° disposed at the upper portion of that trajectory, where these mold halves are held open by two opening ramps, not shown, for the purposes of ejection and then engagement about the tubular plastic material for the formation of a new molded object.

While the invention has been described hereinabove in terms of a presently preferred exemplary embodiment, the invention itself is not limited thereto. Thus, for example, the lateral motion of the extruder 10 need not be controlled directly by the mold and guide roller supports 28 but may rather be synchronized with the motion thereof. In this construction, the extruder 10 and the rollers 34 are translated horizontally independently by separate but synchronized drive means.

It is also possible to dispose the extruder 10 in fixed position whereas the structure for support of the mold carriers 14 may be provided with means permitting horizontal translation thereof. In one modification of this type the support frame carrying the extruder 10 and the rotating shaft 18 of the carrier 17 are both fixed with respect to each other, except for the rotation of that shaft. The mold carriers 14 are however suspended on articulated or telescopic arms which make possible rectilinear motion of the molds when their cradles come into contact with the fixed guide rollers 34. In such a construction, two successive molds 12 may be held coaxial during a period which extends beyond the single critical moment, which construction facilitates placement of the tubular plastic material in mold cavity of the mold.

In addition to the advantages of the invention already mentioned hereinabove, the construction last described makes possible, by reason of the simplicity of its adjustment, various quick changes of molds. The easy replacement of molds and the small number thereof means that machines built in accordance with the invention are particularly well suited to small production runs.

More generally, the invention comprehends all modifications of and departures from the embodiments hereinabove mentioned properly falling within the spirit and scope of the appended claims.

I claim:

1. Apparatus for blow molding hollow articles from tubular plastic material, said apparatus comprising means to deliver a tube of plastic material along an axis fixed with respect to said delivery means, a cyclically movable mold carrier, a plurality of openable molds pivotally supported in the carrier, means to advance the mold carrier to present the molds thereof successively in alignment with said axis, and means to maintain alignment between said axis and each of said molds over a fraction of the cycle of motion of said mold carrier, said mold carrier including a rotatable shaft, arms extending from said shaft, and mold supports coupled to said arms, and wherein said alignment maintaining means comprise means to effect relative translation of said shaft and delivery means transversely of said shaft.

2. Blow molding apparatus according to claim 1 wherein said shaft rotates about a stationary axis and wherein said alignment maintaining means comprise means to translate said delivery means transversely of said shaft.

3. Blow molding apparatus according to claim 1 wherein said means to effect translation comprise abutment means aligned parallel to said axis and against which said molds come to bear when they reach alignment successively with said axis upon rotation of said shaft.

* * * * *